United States Patent [19]
Mishra

[11] 3,846,651
[45] Nov. 5, 1974

[54] DYNAMOELECTRIC MACHINE VENTILATING SYSTEM

[75] Inventor: Anil K. Mishra, Pittsburgh, Pa.

[73] Assignee: Westinghouse Electric Corporation, Pittsburgh, Pa.

[22] Filed: June 12, 1973

[21] Appl. No.: 369,328

[52] U.S. Cl. .................. 310/61, 310/62, 310/269, 310/65
[51] Int. Cl. ............................................. H02k 1/32
[58] Field of Search ......... 310/61, 62, 63, 64, 60 A, 310/269, 52, 58, 59, 65

[56] References Cited
UNITED STATES PATENTS

| | | | |
|---|---|---|---|
| 778,834 | 1/1905 | Alchele | 310/64 |
| 972,850 | 10/1910 | Gray | 310/63 |
| 1,121,014 | 12/1914 | Hobart | 310/64 |
| 1,142,009 | 6/1915 | Blathy | 310/60 A |
| 1,877,904 | 9/1932 | Laffoon | 310/63 |
| 2,436,654 | 2/1948 | Linville | 310/63 |
| 3,098,941 | 7/1963 | Willyoung | 310/61 |
| 3,440,462 | 4/1969 | Willyoung | 310/58 |

FOREIGN PATENTS OR APPLICATIONS

| | | | |
|---|---|---|---|
| 414,803 | 3/1945 | Italy | 310/60 A |
| 1,259,451 | 1/1968 | Germany | 310/60 A |
| 1,087,258 | 8/1960 | Germany | 310/60 A |
| 1,089,056 | 9/1960 | Germany | 310/60 A |
| 1,180,044 | 10/1964 | Germany | 310/60 A |

*Primary Examiner*—J. D. Miller
*Assistant Examiner*—Patrick R. Salce
*Attorney, Agent, or Firm*—G. H. Telfer

[57] ABSTRACT

A dynamoelectric machine, such as a salient pole motor, wherein a cooling fluid, typically air, is directed through a plurality of substantially radial ducts extending through the field windings or the rotor. A flow of fluid coolant is provided by suitable means, such as a fan or blower apparatus. The axial flow of coolant fluid is directed through a plurality of radial ducts disposed in the field windings of the rotor by means of a baffle and an axial header. The axial flow of coolant fluid may also be introduced into a central passage in the rotor shaft, with a plurality of radial conduits in the shaft directing the fluid coolant through the radial ducts in the field windings of the rotor. The coolant fluid is either collected by an axial discharge header and directed into an interpolar spaces lying between the plurality of pole pieces which comprise the rotor, or permitted to pass through a plurality of radial passages extending through the pole pieces of the rotor.

9 Claims, 8 Drawing Figures

3,846,651

DYNAMOELECTRIC MACHINE VENTILATING SYSTEM

BACKGROUND OF THE INVENTION

FIELD OF THE INVENTION

This invention relates to dynamoelectric machines, and more particularly, to motors having improved means for circulating a fluid coolant therein. The ratings of salient pole rotating motors are mainly limited due to the excess temperature rises in the wire or strap-wound field coils and pole faces of the rotor. Maximum available ratings have been reached with the present design of motors and higher ratings are only possible either with further increase in the size of the motor or by providing a more efficient ventilating and cooling system for the motor to obtain maximum possible cooling of the field coils and the pole faces. In prior art motors, a coolant, typically air, is introduced into one end of the rotor of the motor and is conveyed generally through the interior of the rotor to air gaps and radial vents in the stator. Although thermal contact is established between the fluid coolant and those surfaces of the field windings of the rotor having exposure to the axial flow of coolant, thermal contact between the fluid coolant and the interior of the field windings of the rotor is not possible. Thus, excessive temperature rises are encountered within a very short travel from outside of the field windings of the rotor toward the inside thereof which is effectively lowered by introduction of a fluid coolant through the winding of the rotor.

SUMMARY OF THE INVENTION

This invention is related to an improved ventilation or cooling method, so that the temperature rises encountered in present field coil arrangements of an electrical motor are reduced. The interior regions of the field coils of the rotor are forced-air cooled by means of a plurality of radial ducts or vent spacings disposed at predetermined positions within the windings of the field coil. Means for producing an axial flow of fluid coolant, such as a fan or blower, is disposed at the ends of the motor and produces a generally axial flow of fluid coolant, typically air, through the motor. The axial flow of fluid coolant is then directed so as to pass through the plurality of radial ducts located in the windings of the field coils.

In one embodiment of this invention, the axial flow of fluid coolant is directed into the radial ducts in the field windings of the rotor by the use of a baffle. The baffle directs the coolant into a substantially axial header, the header being connected to each of the plurality of radial ducts in the field windings of the rotor.

Another embodiment of the invention utilizes means for producing the flow of fluid coolant, such as a fan or blower, and disposes this means so as to introduce the axial flow of fluid coolant through an internal central passage in the rotor shaft. The fluid coolant is introduced through both ends of the rotor shaft or through one end of the rotor shaft having the other end closed. The rotor shaft is provided with a plurality of radial conduits. These radial conduits are connected to the internal central passage and transmit the axial flow of fluid coolant through the shaft and into the radial ducts disposed in the field windings of the rotor.

After the fluid coolant is directed through the radial ducts in the rotor windings, and the fluid has established thermal contact with the field windings of the rotor, the fluid coolant is collected and directed by an axial discharge header into an interpolar space disposed between the pole pieces which comprise the rotor.

Another embodiment of the invention directs the fluid coolant, after the coolant has passed through the radial ducts in the field windings of the rotor, through a plurality of radial passages extending through the pole head.

The object of this invention is to provide a more efficient method of ventilating and cooling the field coil windings of the rotor of a salient pole motor, so as to reduce the temperature rises now encountered in the field windings of electrical motors, thereby increasing the efficiency or rating of the motor.

BRIEF DESCRIPTION OF THE DRAWINGS

Further advantages and uses of the invention will become more apparent when considered in view of the following detailed description of exemplary embodiments thereof, taken with the accompanying drawings, in which.

DESCRIPTION OF THE PREFERRED EMBODIMENTS

Figure 1:
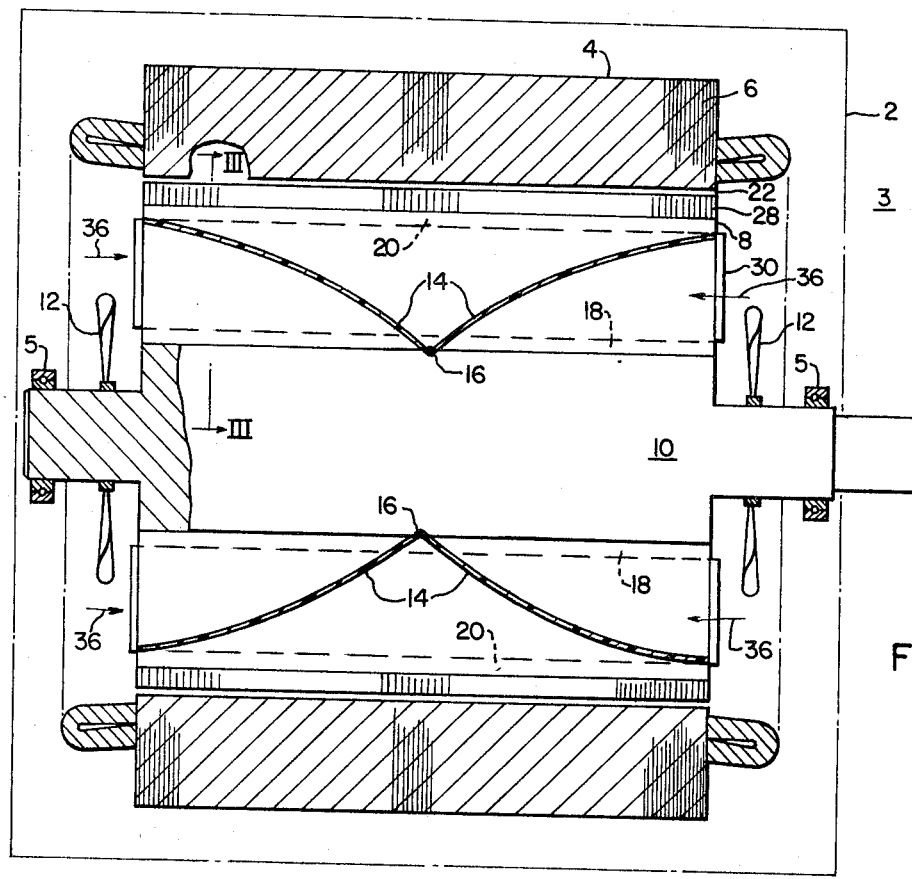
FIG. 1 is a partial side view of a dynamoelectric machine embodying this invention.
Figure 2:
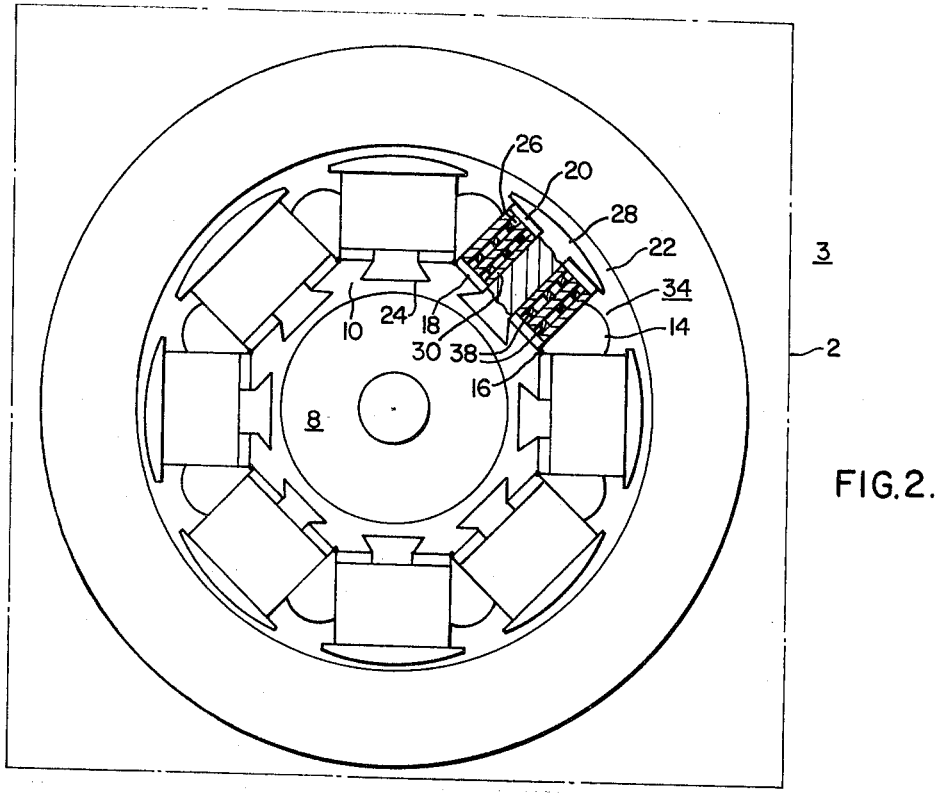
FIG. 2 is an end view of an eight pole dynamoelectric machine such as illustrated in FIG. 1.

Referring now to the drawings, FIG. 1 illustrates a partial side view and FIG. 2 illustrates an end view of an electrical motor showing one embodiment of the invention. A motor casing 2 totally encloses the electrical motor 3 constructed according to the teachings of this invention. The motor 3 is comprised of a stator 4, an axis or shaft 10 extending centrally through the stator 4, and a rotor 8 mounted on the axis or shaft 10.

The stator 4 has a stator winding 6 disposed thereon. An annular space 22 lies between the stator 4 and the rotor 8 and extends axially through the interior of the motor 3.

The axis or shaft 10 extends centrally and axially through the stator 4. The axis of shaft 10 is mounted at each end thereof on a bearing 5.

Figure 6:
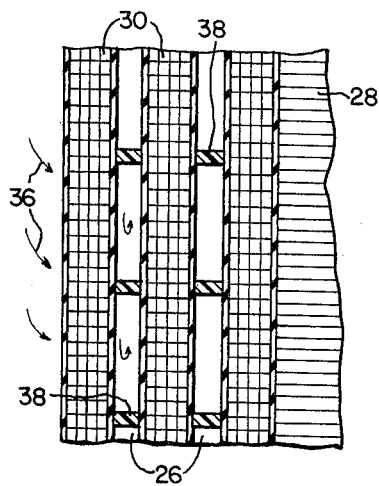
FIG. 6 is a partial top view of the field windings of the rotor of a dynamoelectric machine shown along section line VI—VI of FIG. 3.

The rotor 8 is comprised of a plurality of pole pieces 28. Each of the pole pieces 28 are surrounded by a field winding 30. The field windings 30 have a plurality of radial ducts 26 extending therethrough. The radial ducts 26 are formed by disposing a spacer 38 (FIG. 6)

at predetermined positions within the windings 30. The pole pieces 28 are attached to the axis or shaft 10 by a dovetail joint 24.

A pair of baffles 14 lie between the pole pieces 28 which comprise rotor 8. The baffles 14 are attached at one end thereof to the axis or shaft 10 by suitable means 16 of attachment. A substantially axial header 18 is connected to each of the plurality of radial ducts 26 which extend through the field windings 30. An interpolar space 34 is defined by the baffles 14, the pole pieces 28, and the windings 30. The interpolar spaces 34 extend axially through the interior of the motor 3.

Attached to each end of the axis or shaft 10 is means 12 for providing a flow of fluid coolant, the flow of coolant moving in a generally axial direction as illustrated by arrows 36. The axial flow of fluid coolant is directed by the baffles 14 into an axial header 18. The axial header 18 directs the flow of coolant into the plurality of ducts 26 which extend in a generally radial direction through the field windings 30 of the rotor 8. The fluid coolant is thereby brought into thermal contact with the interior of the field windings 30.

In one embodiment of the invention, (FIG. 3) an axial discharge header 20 is connected to each of the plurality or radial ducts 26 which extend through the windings 30. The axial discharge header 20 is disposed substantially parallel to the axial header 18. The axial discharge header 20 collects the fluid coolant passing through the radial ducts 26 and directs the fluid coolant into the interpolar space 34.

Another embodiment of the invention utilizes a plurality of radial passages 40 (FIG. 4) extending through the pole pieces 28 to direct the fluid coolant into the annular space 22. The fluid coolant continues a generally axial flow through the interior of the machine 3.

The baffles 14, the axial header 18, the axial discharge header 20, are fabricated from a non-magnetic, non-conducting material, so as not to disrupt magnetic flux within the machine. The baffles 14 may be fabricated into any suitable shape, illustrated in the drawings as a curved surface, and are attached to the axis or shaft 10 by suitable means 16.

Referring to FIG. 2, an end view of an eight pole electrical motor illustrates the teachings of this invention. The stator 4 and the annular space 22 completely surround the rotor 8 attached to the shaft or axis 10. The rotor is comprised of the plurality of pole pieces 28 attached to the shaft or axis 10 by means of the dovetail joint 24. Surrounding each pole piece 28 are the field windings 30, the field windings 30 having the radial ducts 26 extending therethrough. The baffle 14 directs the flow of fluid coolant through the axial header 18 which is connected to each of the plurality of the radial ducts 26. In this embodiment of the invention, the axial discharge header 20 collects the flow of fluid coolant which has passed through the radial ducts 26 after the fluid coolant has established thermal contact with the field windings 30 and directs the flow of fluid coolant into the interpolar space 34.

Figure 3:
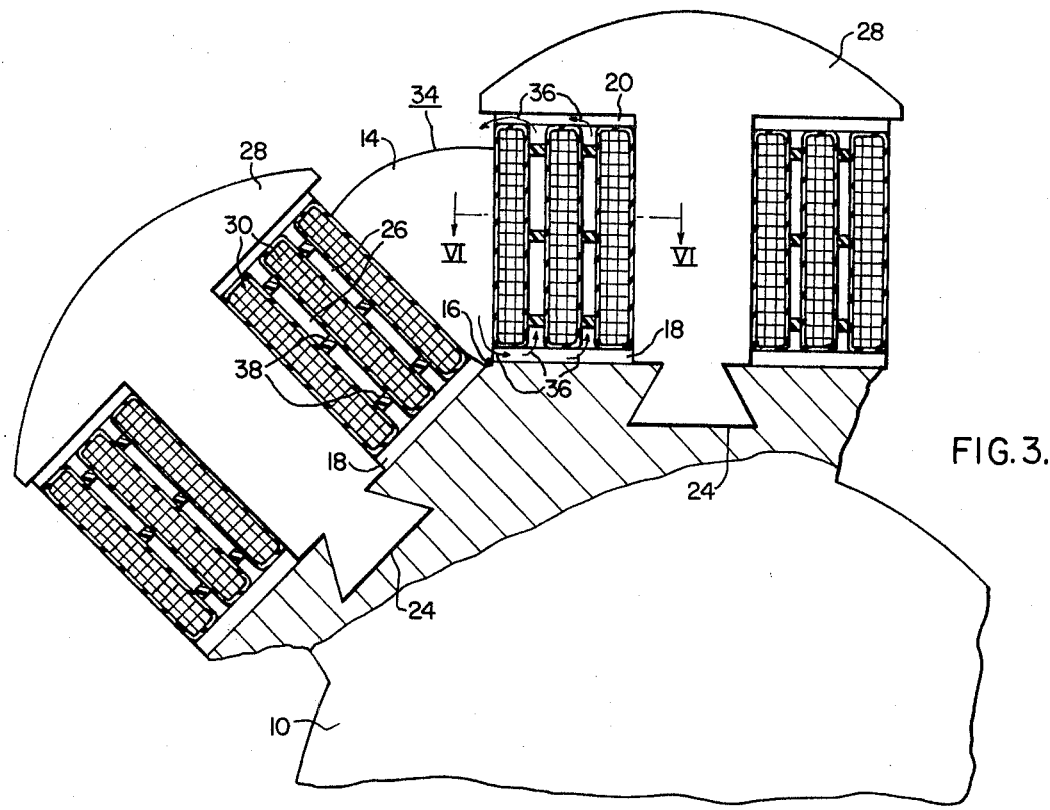
FIG. 3 is a partial end view of a dynamoelectric machine, shown along section line III-III of FIG. 1, showing one embodiment of the invention.

FIG. 3 is a partial end view of an electrical motor shown along section line III—III of FIG. 1 and illustrates the embodiment of the invention shown in FIG. 2. In this embodiment, the fluid coolant produced by means 12 for producing the axial flow of coolant is directed by the baffle 14 into the axial header 18. The baffle 14 is attached to the rotor shaft 10 by suitable means 16 of attachment. The axial header 18 is connected to each of the plurality of radial ducts 26 which extend in a generally radial direction through the field windings 30. The flow of fluid coolant is directed by the baffle 14 into the axial header 18, then through the radial ducts 26. The fluid coolant is collected by an axial discharge header 20, the flow being illustrated by arrow 36. The axial discharge header 20 directs the flow of fluid coolant into the interpolar space 34. The fluid coolant is then discharged into the interpolar space 34.

Figure 4:
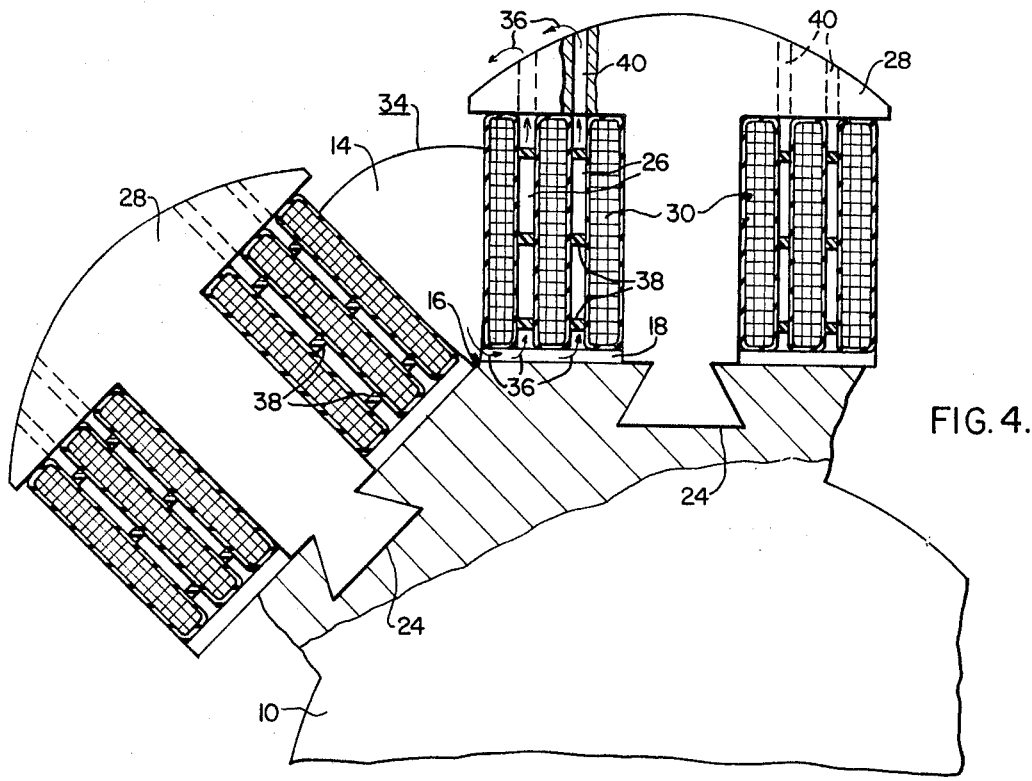
FIG. 4 is a partial end view of a dynamoelectric machine illustrating another embodiment of the invention.

FIG. 4 is an end view of an electrical motor showing another embodiment of the invention. In this embodiment the radial passages 40 are disposed so as to extend in a generally radial direction through the pole piece 28. The radial passages 40 are disposed so as to align themselves with the radial ducts 26 which extend through the field windings 30 of the rotor 8. Thus, the fluid coolant produced by means 12 is directed by the baffle 14 so as to flow through the axial header 18. The fluid is directed by the axial header 18 through the radial ducts 26 and the radial passages 40. The fluid is discharged into the annular space 22 lying between the rotor 8 and the stator 4. The air flow is illustrated by arrow 36.

Figure 5:
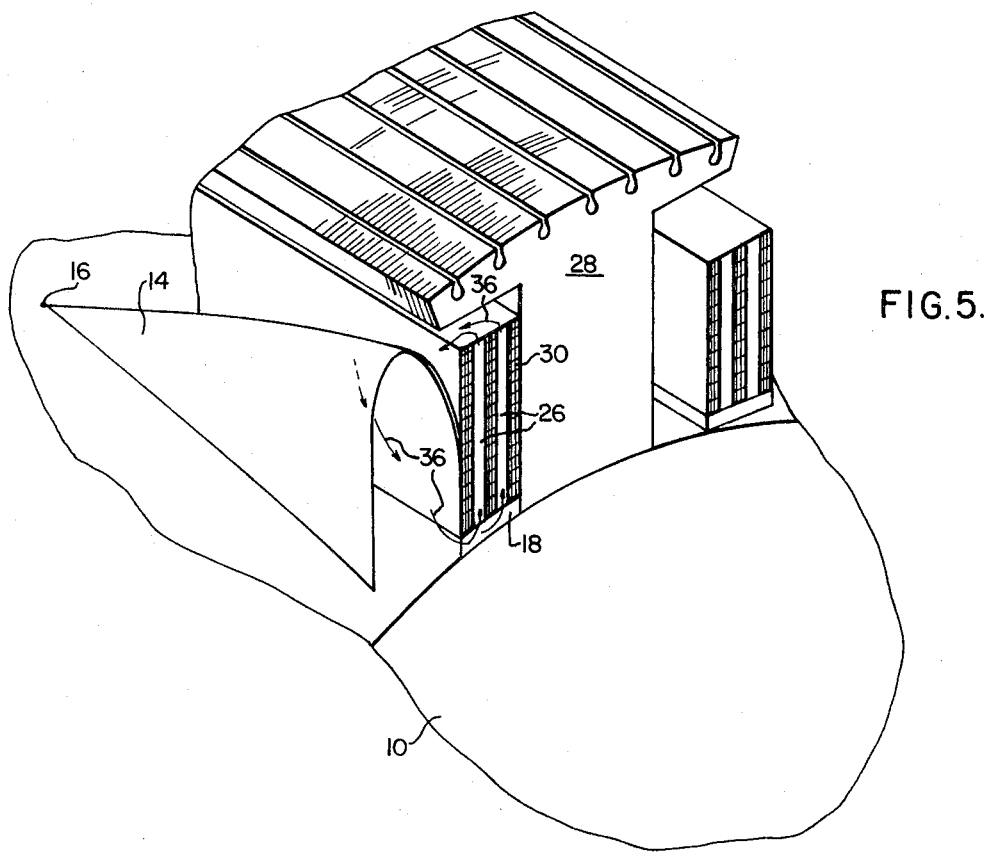
FIG. 5 is a perspective view of a baffle assembly utilized in this invention.

FIG. 5 is a perspective view of the baffle 14. The baffle 14 is attached to the axis or shaft 10 by suitable means 16 of attachment. The flow of fluid coolant produced by means 12, and illustrated by arrow 36, is directed by the baffle 14 and flows through the axial header 18. The flow of fluid coolant passes in a radial direction through the radial ducts 26 which are disposed in field windings 30.

FIG. 6 is a top view of the rotor windings shown along section line VI—VI of FIG. 3, utilizing the teachings of this invention. The flow of fluid coolant, as illustrated by arrow 36, is directed by the baffle 14 through the axial header 18. The fluid is radially directed through the radial ducts 26 which extend through the field windings 30. The plurality of spacers 38 are disposed between the rotor windings 30 at predetermined positions to form the radial ducts 26, the spacers 38 being fabricated from a non-magnetic, non-conducting material. The spacers 38 are any convenient shape, illustrated in the drawing as rectangular.

Figure 7:
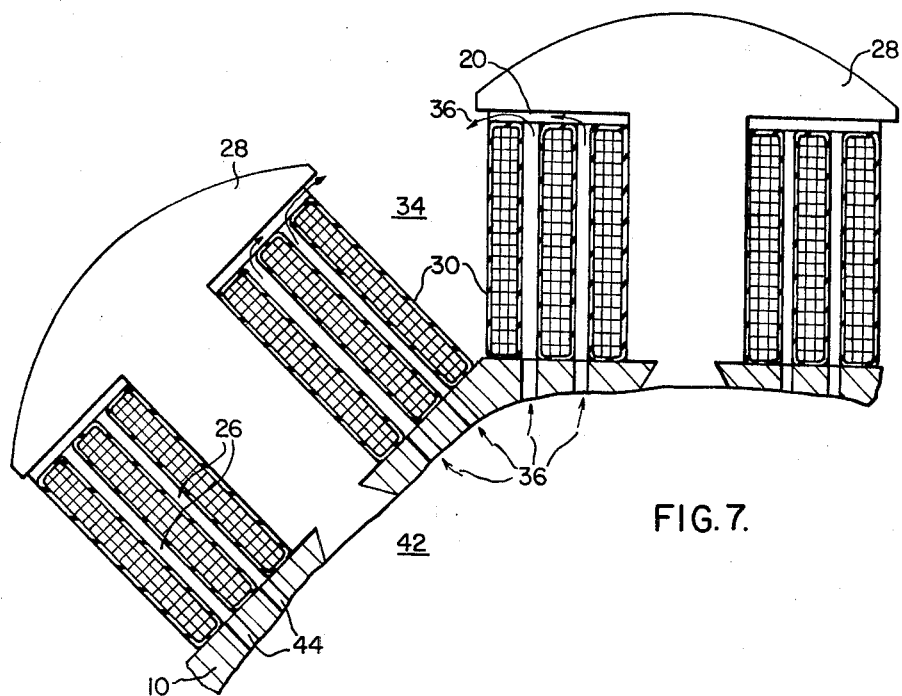
FIG. 7 is a partial end view of a dynamoelectric machine showing still another embodiment of the invention.

FIG. 7 is an end view of an electrical motor illustrating still another embodiment of the invention. In this view the flow of fluid coolant produced by means 12 is introduced into the internal central passage 42 of the axis or shaft 10 at both ends of the shaft 10. However, the fluid coolant may be introduced at one end of the axis or shaft 10 while the other end of the axis or shaft 10 is closed. The flow of fluid coolant introduced into the internal passage 42 of the axis or shaft 10 flows in a generally axial direction. The axis or shaft 10 is provided with a plurality of radial conduits 44 which are connected to the internal central passage 42. The radial conduits 44 align with the radial passages 26 which extend through the field windings 30. The axial flow of fluid coolant is directed through the radial conduits 44 and through the radial ducts 26 disposed in field windings 30. The fluid is collected by the axial discharge header 20 which directs the fluid flow into the interpolar space 34 as illustrated by arrow 36.

Figure 8:
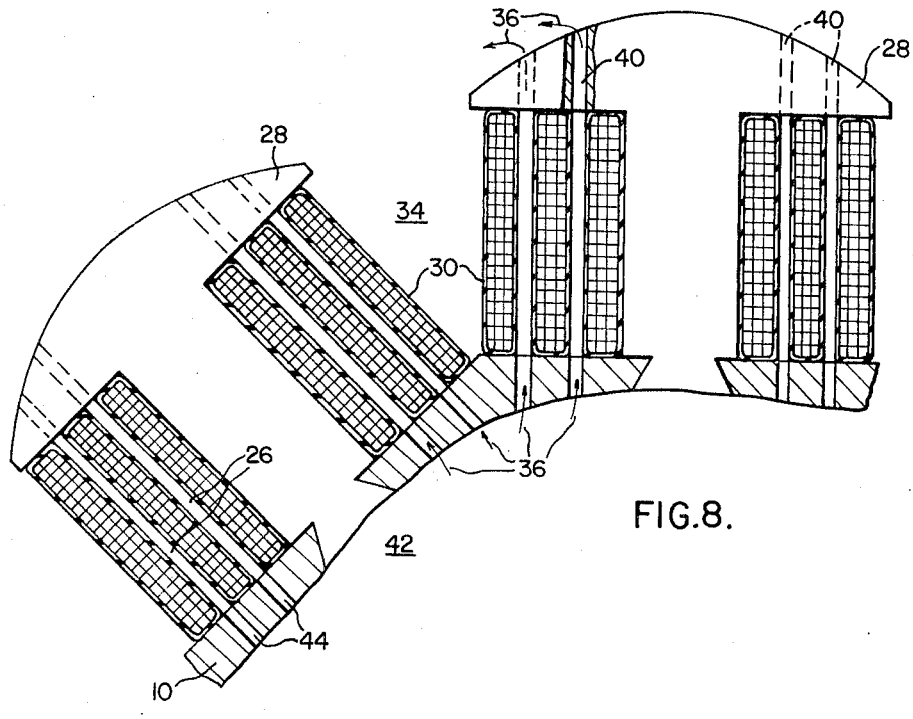
FIG. 8 is a partial end view of a dynamoelectric machine showing still another embodiment of the invention.

FIG. 8 illustrates an end view of an electrical motor showing yet another embodiment of the invention. In this view the radial passages 40 extending through the pole piece 28 are disposed so as to align with the radial ducts 26 which extend through the field windings 30. In this embodiment of the invention, the flow of fluid coolant produced by means 12 which has been introduced into the internal passage 42 of the axis or shaft 10 is directed by the radial conduits 44 which extend through the axis or shaft 10 and which transmit the fluid coolant through the radial ducts 26 which extend through the field windings 30. The flow is directed through the radial passages 40 which extend through the pole pieces 28. The flow of fluid coolant so directed enters the annular space 22 which lies between the stator 4 and the rotor 8.

In summary, this invention discloses a method of ventilating the field windings of a salient pole rotating machine. The axial flow of fluid coolant is directed so as to pass through the plurality of radial ducts which extend through the field windings of the rotor of the salient pole machine. The interior regions of the field windings are then brought into thermal contact with the coolant fluid, thereby reducing the temperature rises which occur within the field windings of the rotor, thus increasing efficiency or rating of the dynamoelectric machine.

Although this invention has been described in connection with ventilation systems for a salient pole electrical motor, it is understood that it may also be applied to the ventilation system of a generator or any other dynamoelectric machine.

I claim as my invention:

1. A dynamoelectric machine comprising:
a stator having windings thereon,
a shaft extending axially and centrally through said stator,
a rotor mounted on said shaft, said rotor comprising a plurality of pole pieces, a winding positioned on each of said pole pieces, said pole pieces defining an interpolar space therebetween, said rotor and said stator defining an annular gap therebetween, said windings each having at least one spacer member disposed therein, said spacer member being fabricated of a non-conducting, non-magnetic material, said spacer member being disposed at a predetermined position within said windings, the disposition of said spacer member within said windings forming at least one cooling duct extending in a generally radial direction through said winding,
means for providing an axial flow of coolant fluid, and,
means directing said coolant fluid through said radial cooling ducts,
said means comprising a baffle member mounted on said rotor, said baffle member adapted to deflect said axial flow of coolant fluid into said radial cooling ducts.

2. The dynamoelectric machine of claim 1, wherein said baffle member adapted to deflect said axial flow of coolant fluid into said radial cooling ducts is attached on said shaft in said interpolar space, said baffle member being fabricated of non-conducting, non-magnetic material, said baffle member being closed at one end thereof, said closed end of said baffle member being disposed on said shaft an axial distance from said means for providing an axial flow of coolant fluid.

3. The dynamoelectric machine of claim 1, wherein said baffle arrangement adapted to deflect said axial flow of coolant fluid into said radial cooling ducts is fabricated of a non-conducting, non-magnetic material, said baffle member having a curved surface having an open end and a closed end, said baffle member being mounted on said shaft near a fixing point with said open end being adjacent to said means for providing an axial flow of coolant fluid, said baffle member and said shaft being spaced a predetermined radial distance apart at all axial points along said shaft in said interpolar space, said greatest radial distance between said baffle member and said shaft being disposed at a first point on said shaft lying adjacent said means for producing an axial flow of coolant fluid, said radial distance between said baffle member and said shaft at any predetermined point on said shaft between said first point and said fixing point decreasing as the axial distance between said predetermined point and said first point increases.

4. The dynamoelectric machine of claim 1, further comprising header means adapted to direct the coolant fluid deflected into said radial cooling ducts by said baffle member into said interpolar space.

5. The dynamoelectric machine of claim 1, wherein said pole pieces have a substantially radial passage extending therethrough, said substantially radial passage through said pole pieces registering with said radial cooling duct, said radial passage being adapted to direct said coolant fluid deflected into said radial cooling duct by said baffle member into said gap between said rotor and said stator.

6. The dynamoelectric machine of claim 1, wherein said rotor has a first end and second end thereon,
first means for providing a first axial flow of fluid coolant attached to said first end of said rotor, said first means being adapted to provide said first axial flow of fluid coolant from said first end of said rotor toward said second end of said rotor,
second means for providing a second axial flow of fluid coolant attached to said second end of said rotor, said second means being adapted to provide said second axial flow of fluid coolant from said second end of said rotor toward said first end of said rotor,
said baffle member being mounted on said rotor in said interpolar space, said baffle member being fabricated of a non-conducting, non-magnetic material, said baffle member being affixed to said rotor at a fixing point axially intermediate said first end and said second end of said rotor,
said baffle member being adapted to deflect said first axial flow of fluid coolant into said radial cooling duct, said baffle member being adapted to deflect said second axial flow of fluid coolant into said radial cooling duct.

7. A dynamoelectric machine comprising:
a stator having windings thereon,
a shaft extending centrally and axially through said stator,
a rotor mounted on said shaft, said rotor comprising a plurality of pole pieces, said pole pieces defining an interpolar space therebetween, said rotor and said stator defining an annular gap therebetween, said windings each having at least one spacer member disposed therein, said spacer member being fabricated of a non-conducting, non-magnetic material, said spacer being disposed at a predetermined position within said windings, the disposition of said spacer member within said windings forming at least one cooling duct extending in a generally radial direction through said windings, means for providing an axial flow of coolant fluid, and, means directing said coolant fluid through said radial cooling ducts, said means comprising said shaft having an internal central passage therein, said shaft being closed at one terminus thereof, said shaft having a plurality of radially outward directed conduits, said radially outward directed conduits being connected to transmit coolant fluid from said central passage in said shaft to said radial cooling ducts extending through said windings.

8. The dynamoelectric machine of claim 7, further comprising header means adapted to direct the coolant fluid transmitted into said radial cooling ducts by said radially outward directed conduits connected to said central passage in said shaft into said interpolar space.

9. The dynamoelectric machine of claim 7, wherein said pole pieces have a substantially radial passage extending therethrough, said substantially radial passage through said pole pieces registering with said radial cooling duct, said radial passages being adapted to direct said coolant fluid transmitted into said radial cooling duct by said radially outward directed conduits connected to said central passage in said shaft into said gap between said rotor and said stator.

* * * * *